United States Patent [19]

Leblanc et al.

[11] 4,099,141
[45] Jul. 4, 1978

[54] LASER GENERATOR

[75] Inventors: Michéle Leblanc, Orsay; Guy Ripart, Le Plessis Robinson; Albert Brule, Issy-les-Moulineaux, all of France

[73] Assignee: Compagnie Industrielle des Lasers, Marcoussis, France

[21] Appl. No.: 667,799

[22] Filed: Mar. 17, 1976

[30] Foreign Application Priority Data

Apr. 3, 1975 [FR] France .................. 75 10410

[51] Int. Cl.² .................................. H01S 3/08
[52] U.S. Cl. ................................. 331/94.5 C
[58] Field of Search .......... 331/94.5 C, 94.5 D

[56] References Cited

U.S. PATENT DOCUMENTS

| | | | |
|---|---|---|---|
| 3,628,180 | 12/1971 | Segre | 331/94.5 C |
| 3,855,547 | 12/1974 | Kirk | 331/94.5 C |
| 3,943,461 | 3/1976 | Ichinose et al. | 331/94.5 C |

OTHER PUBLICATIONS

Karube et al., Alignment Characteristics of an Optical Maser with a Corner Prism, Japanese J. Appl. Phys., vol. 6, No. 3 (Mar. 1967) pp. 364–374.

Primary Examiner—William L. Sikes
Attorney, Agent, or Firm—Sughrue, Rothwell, Mion, Zinn and Macpeak

[57] ABSTRACT

The invention relates to a laser generator. That generator comprises optical resonant cavity of the folded type, limited by two plane mirrors arranged in a same plane, side by side and a corner cube reflector for sending back the radiation coming from one of the said mirrors towards the other mirror. Application to telemeters and to illuminators.

4 Claims, 5 Drawing Figures

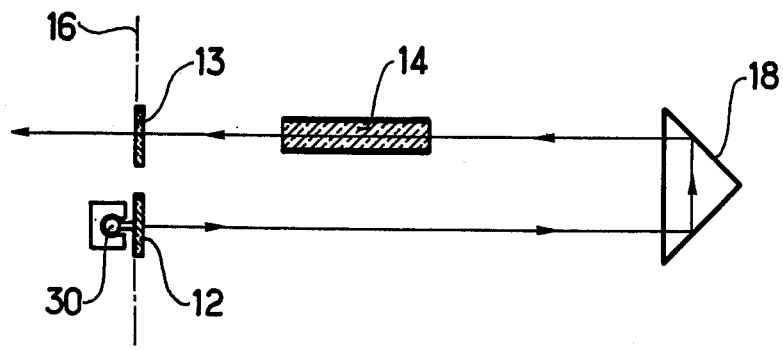
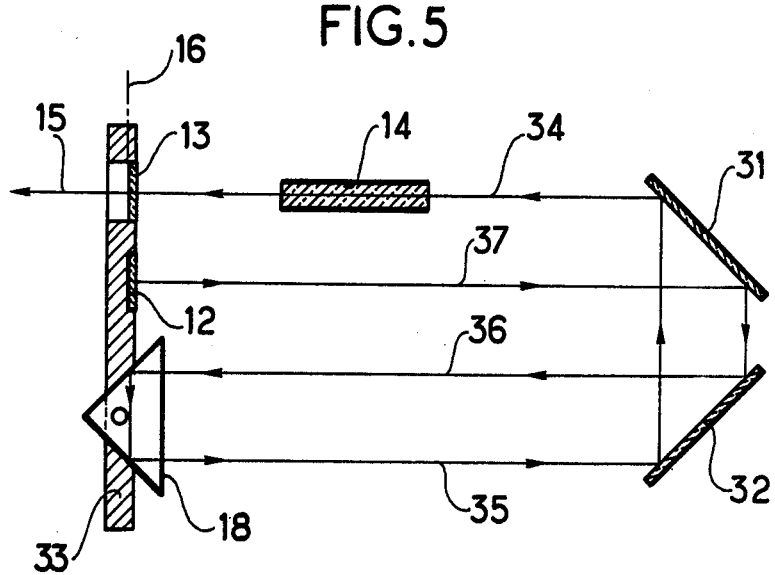

LASER GENERATOR

The present invention concerns laser generators.

Laser generators comprising, essentially, an optical resonant cavity, called a Fabry-Perot cavity, limited by two mirrors, an active material arranged in that cavity and means for exciting that active material, suitable for generating an oscillating radiation in that cavity, are known. It is also known that the divergence of the laser beams emitted by those generators is all the weaker as the length of the cavity is greater.

When it is required to obtain a laser beam having slight divergence, circumstances therefore make it necessary to increase the length of the cavity, this leading to the manufacturing of very bulky lasers.

To reduce the longitudinal bulk of these generators, lasers having a cavity of the type called a folded cavity, such as the one shown diagrammatically in FIG. 1 have been manufactured. That laser comprises a bar of active material 1 arranged inside an optical resonant cavity limited by two mirrors 2 and 3 and means (not shown) for exciting that material, suitable for giving rise to an oscillating radiation in the cavity. A beam 4 of that radiation, perpendicular to the plane of the mirror 2, reaches 5 on the mirror 3, perpendicularly to its plane, after reflection on successive reflecting mirrors 6, 7 and 8. The mirror 3 is semi-transparent to enable a laser beam 9 to emerge from the cavity. The reflecting mirrors are placed as shown in the figure so as to form a folded cavity, having several successive broken line-shaped sections. It is clear that the longitudinal dimension of that cavity is very much less than that of the equivalent rectilinear cavity. Each mirror of the laser is arranged on a support; those supports are firstly directed suitably, then fixed to a reference surface of the housing of the laser.

The lasers mentioned hereinabove have disadvantages.

Indeed, the optical adjusting thereof is difficult. In lasers having a long rectilinear cavity, the parallelism of the mirrors must be strict to prevent the radiation from leaving the cavity. In the laser having a folded cavity shown in FIG. 1, the mirrors 6, 7, 8 and 3 must be directed in a very precise way, otherwise, the ray 5 reaches the mirror 3 at an angle other than 90° and the ray reflected by that mirror emerges very rapidly from the cavity.

Moreover, the optical adjusting of those lasers is not stable in time, more particularly when the laser generator is subjected to severe environment conditions (differences in temperature, shocks, vibrations), this being the case for lasers intended to be used in military applications.

The aim of the present invention is to overcome those disadvantages and to produce a laser generator of the type having a folded cavity whose optical adjustment is very simple, that adjustment being stable in difficult conditions of use.

The present invention has as its object a laser generator comprising:

An optical resonant cavity of the folded type, limited by
  two plane mirrors, a first totally reflecting mirror and
  a second partly transparent mirror;
An active material arranged inside the said cavity;
Means for exciting that active material, suitable for
  generating an oscillating radiation in the said cavity,
  a part of the radiation being able to emerge from the
  said cavity through the said second mirror to form a
  laser beam; characterized in that the said two plane
  mirrors are arranged side by side, substantially in the
  same plane, the reflecting faces of those mirrors being
  situated on a same side of that plane and in that it
  comprises a corner cube reflector arranged to send
  back, by successive reflections on the faces of that
  reflector, the radiation coming from one of the said
  two plane mirrors towards the other mirror.

The present invention is described hereinbelow, by way of illustration but having no limiting character, with reference to the accompanying drawing, in which:

FIG. 4 shows a second embodiment of the generator according to the invention;

And FIG. 5 shows a third embodiment of the laser generator according to the invention.

Figure 2:
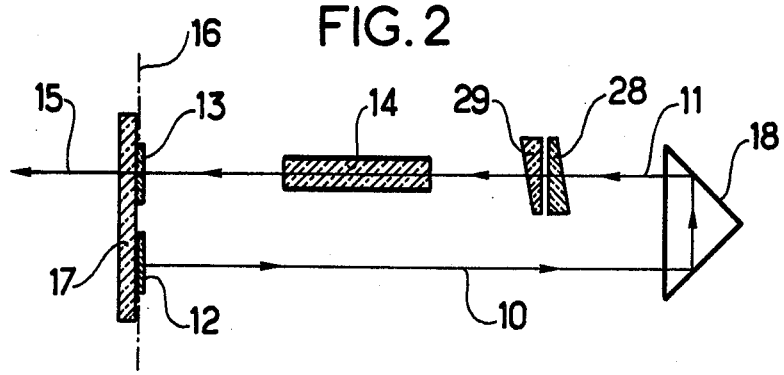
FIG. 2 shows a first embodiment of the laser generator according to the invention.

FIG. 2 shows a laser generator comprising, more particularly, an optical resonant cavity of the folded type. The length of that cavity comprises two successive rectilinear sections 10 and 11. Two mirrors 12 and 13 limit the cavity, the mirror 12 being a totally reflecting mirror and the mirror 13 being partly transparent. An active material 14, for example a glass rod doped with neodymium, is arranged inside the cavity. Means (not shown) for exciting the active material 14 generate, in that cavity, an oscillating radiation a part of which can emerge through the mirror 13 to form a laser beam 15.

According to one configuration of the invention, mirrors 12 and 13 are arranged side by side, substantially in a same plane 16. The reflecting faces of those mirrors are situated on a same side of that plane, that side evidently being the one on which the sections 10 and 11 are situated. The two mirrors 12 and 13 can be fixed to a same support; that support is then, for example, an optical blade 17 in which a portion of one face is treated to reflect totally the radiation, in order to constitute the mirror 12 and another portion is treated to reflect a part of the radiation which it receives and to allow the other part to pass in order to form the mirror 13.

A corner cube reflector shown diagrammatically at 18 is arranged to send back towards the mirror 13 by successive reflections on its faces, the radiation 10 coming from the mirror 12.

Figure 3:
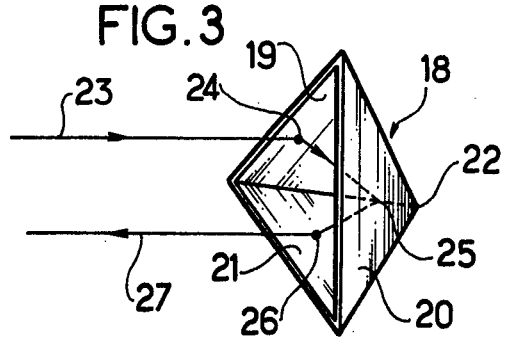
FIG. 3 is a view of a part which is a component of the generator shown in FIG. 2.

FIG. 3 is a view in space of a corner cube reflector such as the reflector 18. It comprises three plane faces 19, 20 and 21, perpendicular to each other two by two and forming a tri-rectangular tri-hedron whose apex is 22. Those faces are made either of glass or of metal and are polished on the inside so that the concave surface of the reflector be reflecting. If a beam 23 strikes the reflecting face 19 of the reflector 18 at 24, it is reflected at 25 on the face 20 and at 26 on the face 21 to emerge again in the direction of a beam 27. It is well-known that the beams 23 and 17 are then parallel to each other, that parallelism being independent, to a large extent, from the angle of incidence of the beam 23 on the face 19.

Again with reference to FIG. 2, a ray such as 10, perpendicular to the plane of the mirror 12 is sent back by the reflector 18 towards the mirror 13 along a ray 11 parallel to the ray 10. As the mirror 13 is in the same plane as the mirror 12, the ray 11 is necessarily perpendicular to the plane of the mirror 13.

The device according to FIG. 2 does not require any precise optical adjustment and its operation is not in danger of being affected by variations in temperature, shocks or vibrations since the parallelism of the rays 10 and 11 is largely dependent on the direction in which the corner cube reflector is set.

Nevertheless, in practice, the obtaining of a strict parallelism between the rays 10 and 11 requires a very great accuracy in the forming of the faces of the corner cube reflector and entails, consequently, a high cost price. With a currently manufactured corner cube reflector, the beams 10 and 11 form, between them, a very slight angle which is, however, sufficient to compromise the proper operation of the cavity.

To compensate that angular error, an optical device suitable for deviating the radiation through an angle equal to and in the opposite direction to the angle of error can be inserted in the cavity. That optical device can be, for example, a device called a "diasporameter" comprising two optical prisms arranged against each other on one of their faces, each of those prisms contingently being driven in a rotating movement about a pin crossing through their faces. In FIG. 2, a diasporameter comprising two prisms 28 and 29, crossed from one face to the other by the radiation, their axis of rotation being merged with the axis of the radiation, has been arranged in the cavity. It is then possible to obtain a predetermined deviation of the radiation, compensating exactly a contingent angular error brought in by the reflector 18, by adjusting suitably the position of the prisms 28 and 29 about the axis of rotation.

That angular error can also be compensated by inclining one of the mirrors of the cavity in relation to the other.

For that purpose, the support of the totally reflecting mirror can be machined for that mirror to have the required inclination. The support of the totally reflecting mirror can be assembled, also, on a knuckle joint 30, as shown in FIG. 4.

Figure 1:
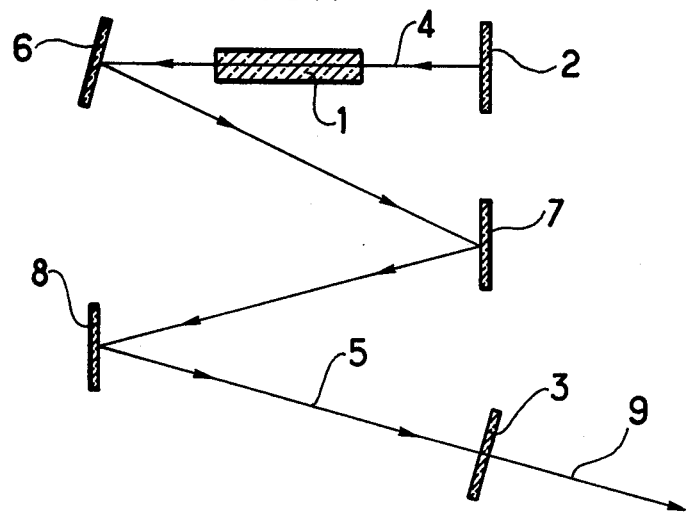
FIG. 1 shows diagrammatically a laser generator of known type, described hereinabove.

It is certain that the compensating of the angular error brought in by the corner cube reflector can require an accurate optical adjustment of one of the mirrors of the cavity. But on the one hand, it is the only precise adjustment to be effected, whereas the known device shown in FIG. 1 comprises four.

On the other hand, the mirrors 12 and 13 of the cavity being fixed side by side, their mutual positioning in relation to each other is much less sensitive to outside disturbing agents than when they are arranged at both ends of a rectilinear cavity having a great length.

When the angular compensation is effected by means of a diasporameter, the latter is made so that a relatively great rotation of the prisms causes a very slight deviation of the light rays; an unforeseeable disturbing of the adjustment of the direction of those prisms therefore has little influence on the value of the angle of deviation.

By the means described hereinabove for compensating the angular error brought in by the corner cube reflector, it is possible, moreover, to compensate any other angular error caused by a faulty parallelism, for example of the faces of the rod of active material or of those of a Pockels optical cell contingently arranged in the cavity to generate a laser pulse.

FIG. 5 shows an embodiment of the invention which is particularly recommended when it is required to produce a generator of a laser beam having very slight divergence. As in the case of FIG. 2, the mirrors 12 and 13 are always arranged side by side and in the same plane, but the radiation coming from the mirrors 12 and 13 is sent back towards the corner cube reflector 18 by successive reflections on two reflecting mirrors 31 and 32. The reflector 18, the mirror 12 and the mirror 13 can then, to great advantage, be fixed on a same support 33. The optical cavity thus comprises four successive sections 34, 35, 36 and 37 which are parallel to each other, the total length of the folded cavity contingently easily reaching 60 centimeters to one meter.

In that configuration, it will be seen that even if the direction of the mirrors 31 and 32 is slightly modified under the influence of outside disturbing agents, the cavity still remains resonant since the rays 34 and 37 are compulsorily parallel to each other and perpendicular to the plane 16 of the mirrors 12 and 13. For a disturbing of the adjustment of the reflecting mirrors to be detrimental to the proper operation of the laser, it would be necessary for the radiation to emerge from the useful surface of the mirrors or to pass outside the active laser material, but this would then be the case of very great disturbances of the adjustment, in the order of a minute of an arc, whereas the outside disturbing agents generally cause disturbances of the adjustment in the order of a second of an arc.

In a particular embodiment of the device shown in FIG. 5, the two reflecting mirrors 31 and 32 can be constituted by the two reflecting faces of a totally reflecting optical prism (not shown).

The compensation means for the angular error brought in by the corner cube reflector, described with reference to the device shown in FIG. 2, are obviously applicable in the same way to the device illustrated in FIG. 5.

The laser generator which is the object of the invention can be used in all cases where it is required to obtain a laser beam having slight divergence in severe environment conditions and when a slight longitudinal bulk is required. That laser generator can be applied more particularly to the producing of telemeters and of illuminators intended for military applications.

We claim:

1. Laser generator comprising:
   an optical resonant cavity of the folded type, limited by two plane mirrors, a first totally reflecting mirror and a second partly transparent mirror;
   an active material arranged inside said cavity;
   means for exciting that active material, suitable for generating an oscillating radiation in said cavity, a part of the radiation being able to emerge from said cavity through said second mirror to form a laser beam; characterized in that said two plane mirrors are arranged side by side substantially in the same plane, the reflecting faces of those mirrors being situated on the same side of that plane and in that said generator comprises a corner cube reflector arranged to send back, by successive reflections on the faces of that reflector, the radiation coming from one of said two plane mirrors towards the other mirror, said two plane mirrors being arranged so that their planes form, together, a small predetermined angle.

2. Generator according to claim 1, characterized in that it comprises means for adjusting the direction of one of said two plane mirrors in relation to the other.

3. Generator according to claim 2, characterized in that said means for adjusting the direction of said one of said two plane mirrors in relation to the other comprises a knuckle joint.

4. Laser generator comprising:
an optical resonant cavity of the folded type, limited by two plane mirrors, a first totally reflecting mirror and a second partly transparent mirror;
an active material arranged inside said cavity;
means for exciting that active material, suitable for generating an oscillating radiation in said cavity, a part of the radiation being able to emerge from said cavity through said second mirror to form a laser beam; characterized in that said two plane mirrors are arranged side by side substantially in the same plane and are fixed on the same support, the reflecting faces of those mirrors being situated on the same side of that plane and in that said generator comprises a corner cube reflector arranged to send back, by successive reflections on the faces of that reflector, the radiation coming from one of said two plane mirrors towards the other mirror; and
means for deviating, in said cavity, said radiation through a small predetermined angle, said means for deviating comprising two optical prisms crossed successively from one to the other by said radiation, one face of one of those prisms being adjacent to one face of the other prism, said prisms being relatively rotatable with respect to each other about a common axis which intersects the faces of said two prisms and which is substantially parallel to said radiation.

* * * * *